United States Patent [19]

Burke et al.

[11] Patent Number: 5,019,622

[45] Date of Patent: May 28, 1991

[54] ROSIN MODIFIED STYRENE ACRYLIC RESIN

[75] Inventors: Roger E. Burke, Murfreesboro; James G. Spruill, Colerain, both of N.C.

[73] Assignee: Resinall Corporation, Stamford, Conn.

[21] Appl. No.: 300,274

[22] Filed: Jan. 19, 1989

[51] Int. Cl.$^5$ .................... C08G 63/48; C04F 277/00
[52] U.S. Cl. .................... 524/532; 525/289; 525/54.44; 526/238.3
[58] Field of Search ............... 528/501; 524/274, 532; 525/289, 54.44; 526/238.3

[56] References Cited

U.S. PATENT DOCUMENTS

| | | | |
|---|---|---|---|
| 2,574,847 | 11/1951 | Schertz | 526/238.3 |
| 3,926,893 | 12/1975 | Woodward | 524/276 |
| 4,162,997 | 7/1979 | Welsh | 524/274 |
| 4,195,169 | 3/1980 | Priddy | 528/500 |
| 4,418,191 | 11/1983 | Irvin | 528/500 |
| 4,423,207 | 12/1983 | Flock et al. | 528/500 |
| 4,535,049 | 8/1985 | Honda et al. | 524/275 |
| 4,681,909 | 7/1987 | Ohta et al. | 524/272 |

FOREIGN PATENT DOCUMENTS 176621  8/1986  Japan ................ 526/238.3

*Primary Examiner*—John Kight, III
*Assistant Examiner*—Dennis A. Daley
*Attorney, Agent, or Firm*—Darby & Darby

[57] ABSTRACT

A rosin modified acrylic resin for use in a toner composition is provided. The resin is prepared by steam stripping a mixture of solution polymerized styrene-acrylic copolymer rosin, and a suitable solvent, such as toluene or xylene, followed by cooling and grinding to form the styrene acrylic-rosin resin. This binder resin can be used in a toner composition which, due to the resin, has an inherent positive charge of at least 2.0.

19 Claims, No Drawings

ROSIN MODIFIED STYRENE ACRYLIC RESIN

BACKGROUND OF THE INVENTION

This invention relates generally to a novel rosin modified styrene/acrylic binder resin and more particularly to such a resin which is useful as a component of a reprographic dry toner composition.

In electrophotographic printing, generally a uniform electrostatic charge is applied to a photoconductive insulating layer and the resulting charged surface is selectively exposed to electromagnetic radiation so as to dissipate the charge in those areas exposed to the radiation, thereby producing an electrostatic latent image. The resulting latent image is subsequently developed by depositing (typically by use of the well known "cascade" method) a finely divided electroscopic developer material, referred to as toner, on the electrostatically formed image. Generally speaking, the charged toner particles will have a charge opposite to the residual electrostatic charge image, so that the toner particles adhere to the charged areas to form a visible image. This image may be fixed in situ on the support or transferred to a secondary support surface, and the transferred image permanently affixed to the secondary support surface.

Two component developer mixtures are conventionally used to develop electrostatic latent images, comprising a pigmented resinous toner powder and a carrier component wherein the carrier component is substantially larger in size than its toner complement. The toner particles, which are generally made of a fine pigmented resinous material, are charged triboelectrically by rubbing against the carrier particles causing them to adhere electrostatically. The composition of the developer mix is chosen such that the toner particles will acquire an electrostatic charge of a polarity opposite to that of the electrostatic image to be developed. As a result, when the developer is brought into contact with the electrostatic latent image, the toner particles are attracted from the carrier particles and selectively deposited onto the electrostatic image by the electrostatic charge of the image. The powder or toner image that is obtained is either fixed in situ on the surface of the image bearing substrate, or the powder image is selectively transferred to a receiving surface to which it is then fixed. The fixing process can reflect any one of several approaches such as pressure fixing, vapor fixing or heat fusing, depending upon the specifics of the particular system.

In another form of development utilizing a developer mix comprising a carrier and toner component, a developer composition containing toner and magnetic carrier particles is transported by a magnet. The resulting magnetic field causes alignment of the magnetic carrier into a brush like configuration. This magnetic brush is engaged with the electrostatic image bearing surface, and the toner particles supported on the brush like configuration are drawn from the "brush" to the latent image by electrostatic attraction. Thus, a developer mixture may be provided comprising a toner material and a carrier material which consists of particles which are magnetically attractable. Such a configuration is generally referred to as a magnetic brush development system (as opposed, for example, to the cascade method which often uses glass beads as the carrier).

When the non-exposed portion of the surface of the photosensitive layer, prior to the developing step, is charged with a negative electric charge after charging and exposure, a positive picture cannot be obtained unless it is developed with a toner which is charged with a positive electric charge. However, most resin powders imparted with friction by the cascade method (using glass beads as the carrier), or by the magnetic brush method (using iron powder as the carrier) are charged with a negative charge, and very few of them are charged with a positive electric charge.

In order to impart to the toner either a strong negative or positive charge, it is necessary to add a charge control agent. Typically, such charge control agents comprise any one of a number of known dyes. Because the vast majority of known toner compositions have inherently negative charges, large amounts of charge control dyes (e.g. basic dyes) must be used to provide a strong positive charge (e.g. about +10 to +12) to the toner when a positively charged toner is needed (as is often the case). It will be appreciated that the addition of such positive charge control agents will add additional costs in materials acquisition and processing. Accordingly, there is a perceived need for a toner composition which has an inherent positive charge and so requires relatively smaller quantities of a charge control agent for developing a positive picture.

Another well known problem with conventional toner compositions is that the charge control additive both does not admix well in the toner compositions, nor does it disperse uniformly therein. As a consequence, the surfaces of the resulting toner particles are not charged uniformly, either negative or positive, thereby causing fogging or trailing phenomena at the development stage; and thereby preventing the obtaining of clear and sharp developed images.

SUMMARY OF THE INVENTION

The above discussed and other drawbacks and deficiencies in the prior art are alleviated by the styrene acrylic-rosin resin of the present invention. The resin is prepared by steam stripping a mixture of solution polymerized styrene-acrylic copolymer, rosin, and a suitable solvent, such as toluene or xylene, followed by cooling and grinding. The copolymer is provided in a weight percent of between 55% and 91%. The rosin is provided in a weight percent of between 9% and 45%. This resin has a positive charge of at least 2.0 volts/g. It is used in a dry toner composition which is also positively charged. This inherent positive charge is in contrast to typical prior art toners which are inherently negatively charged (e.g. typically -14 to -6). As a result, toner compositions made with the resin of this invention need much less of an addition of a charge control agent to bring the positive charge to the required +10 to +12, thereby leading to a far lower manufacturing cost.

An important feature of the rosin modified styrene acrylic binder resin of this invention is its compatibility with numerous polymers and resins commonly used to provide uniform dispersion of conventional toner additives and binders including nitrocellulose and rosin maleic esters (lacquer resins), thereby diminishing the fogging and trailing phenomena. The above discussed and other features and advantages of the present invention will be appreciated and understood by those of ordinary skill in the art from the following detailed description.

DESCRIPTION OF THE PREFERRED EMBODIMENT

In accordance with the present invention a toner binder resin having both a positive charge and compatibility with certain polymers and resins is prepared by combining a solution polymerized styrene acrylic polymer (still in solution) with rosin and a suitable solvent such as xylene or toluene. This mixture is stirred until homogenous solution is obtained.

In the next step, the solvent is stripped from the solution with heat. Preferred results are obtained using a distillation by solvent steam stripping at about 250° C, and most preferably under reduced pressure. The stripped resin is then cooled and ground to define a toner binder resin which exhibits a glass transition temperature of about 30 to 65° C, is compatible with polymers such as nitrocellulose, and is positively charged.

The styrene acrylic polymer initially mixed with the rosin must be prepared using solution polymerization techniques to obtain the desirable toner properties of positive charge and compatibility. By weight the ratio of the polymer and rosin is from 9:1 to 1:9; preferably the resin is between 55% and 91% of the copolymer/rosin mixture and the rosin is between 9% and 45% of same. A workable solution polymerized styrene acrylic copolymer is commercially obtainable (still in solution form) under the tradename RP-1215 from Monsanto Chemical Company. Alternatively, the solution polymerized styrene acrylic copolymer may be prepared from known methods such as the following procedure: acrylic monomers such as ethyl acrylate, ethyl methacrylate, butyl acrylate and butyl methacrylate and styrene comonomers are copolymerized by vinyl addition polymerization with up to 10 weight percent of acrylic acid or methacrylic acid to provide an acid modified acrylic polymer; the polymerization is carried out in a suitable solvent such as toluene or xylene.

The dry toner binder may be combined with any of the known conventional coloring pigments, charge controlling dyes and carriers such as iron powder or glass beads to provide a dry toner composition for use in either the cascade or brush method of electrophotographic printing. For example, toner may be produced by dry blending of 92g of rosin modified styrene acrylic resin with 8g carbon followed by compounding on a two roll mill for 5 minutes at 125° C.

The following procedure can be used to produce the product of the present invention. The acrylic polymer is charged to a suitable reactor, along with the required amount of rosin. Xylene (5% to 10%) may be added if the viscosity of the solution is too high for processing. The mixture is heated to about 250° C, removing the solvent and small amounts of water resulting from the dehydration and condensation of the resin acids. Upon reaching 250° C, the product is steamed and/or vacuum stripped to remove solvent and light ends, to reduce odor and obtain physical properties.

Set forth on the following pages are examples of formulations and properties of the rosin modified styrene acrylic resin of the present invention.

EXAMPLE 1

| FORMULA | WEIGHT % |
|---|---|
| A solution of styrene/ethyl acrylate/ acrylic acid copolymer in toluene with polymer solids approximately 50% | 75.0 |
| Gum rosin | 25.0 |
| | 100.0 |

| PRODUCT PROPERTIES | |
|---|---|
| Softening Point, R & B, °C. (MP) | 119 |
| Acid Number (AN) | 71.2 |
| Viscosity, Gardner 50% Toluene, 25° C. | M |
| Color, Gardner 50% Toluene | 5 |
| 50% Toluene, Solution Tolerance, g/10 g | |
| Isopropanol tolerance | 4.8 |
| Mineral Spirits tolerance | 4.2 |
| Acetone tolerance | Infinite |
| Methyl ethyl ketone tolerance | Infinite |
| Tg (Glass Transition temperature), °C. | 64 |

EXAMPLE 2

| FORMULA | WEIGHT % |
|---|---|
| A solution of styrene/ethyl acrylate/ acrylic acid copolymer in toluene with polymer solids approximately 50% | 86.96 |
| Gum rosin | 13.04 |
| | 100.00 |

| PRODUCT PROPERTIES | |
|---|---|
| Softening Point, R & B, °C. (MP) | 124.5 |
| Acid Number (AN) | 43.4 |
| Viscosity, Gardner 50% Toluene, 25° C. (V5T) | V |
| Color, Gardner 50% Toluene (C5T) | 6+ |
| 50% Toluene, Solution Tolerance, g/10 g | |
| Isopropanol tolerance | 6.8 |
| Mineral Spirits tolerance | 8.9 |
| Acetone tolerance | Infinite |
| Methyl ethyl ketone tolerance | Infinite |

EXAMPLE 3

| FORMULA | WEIGHT % |
|---|---|
| A solution of styrene/ethyl acrylate/ acrylic acid copolymer in toluene with polymer solids approximately 50% | 83.33 |
| Gum rosin | 16.67 |
| | 100.00 |

| PRODUCT PROPERTIES | |
|---|---|
| Softening Point, R & B, °C. (MP) | 116 |
| Acid Number (AN) | 48.9 |
| Viscosity, Gardner 50% Toluene, 25° C. (V5T) | T-U |
| Color, Gardner 50% Toluene (C5T) | 5+ |
| 50% Toluene, Solution Tolerance, g/10 g | |
| Isopropanol tolerance | 3.7 |
| Mineral Spirits tolerance | 8.9 |
| Acetone tolerance | Infinite |
| Methyl ethyl ketone tolerance | Infinite |

EXAMPLE 4

| FORMULA | WEIGHT % |
|---|---|
| A solution of styrene/ethyl acrylate/ acrylic acid copolymer in toluene with polymer solids approximately 50% | 90.73 |
| Gum rosin | 9.27 |
| | 100.00 |

| PRODUCT PROPERTIES | |
|---|---|
| Softening Point, R & B, °C. (MP) | 128 |
| Acid Number (AN) | 33.7 |
| Viscosity, Gardner 50% Toluene, 25° C. (V5T) | W-X |
| Color, Gardner 50% Toluene (C5T) | 4+ |

-continued

| 50% Toluene, Solution Tolerance, g/10 g | |
|---|---|
| Isopropanol tolerance | 6.0 |
| Mineral Spirits tolerance | 5.5 |
| Acetone tolerance | Infinite |
| Methyl ethyl ketone tolerance | Infinite |

EXAMPLE 5

| FORMULA | WEIGHT % |
|---|---|
| A solution of styrene/ethyl acrylate/ acrylic acid copolymer in toluene with polymer solids approximately 50% | 55.56 |
| Gum rosin | 44.44 |
| | 100.00 |

| PRODUCT PROPERTIES | |
|---|---|
| Softening Point, R & B, °C. (MP) | 110 |
| Acid Number (AN) | 97.0 |
| Viscosity, Gardner 50% Toluene, 25° C. (V5T) | F-G |
| Color, Gardner 50% Toluene (C5T) | 8+ |
| 50% Toluene, Solution Tolerance, g/10 g | |
| Isopropanol tolerance | 10.4 |
| Mineral Spirits tolerance | 8.3 |
| Acetone tolerance | Infinite |
| Methyl ethyl ketone tolerance | Infinite |

EXAMPLE 6

| FORMULA | WEIGHT % |
|---|---|
| A styrene/acrylic ester copolymer in toluene, polymer solids approximately 65% | 86.96 |
| Gum rosin | 13.04 |
| | 100.00 |

| PRODUCT PROPERTIES | |
|---|---|
| Softening Point, R & B, °C. (MP) | 100 |
| Acid Number (AN) | 42.0 |
| Viscosity, Gardner 50% Toluene, 25° C. (V5T) | R+ |
| Color, Gardner 50% Toluene (C5T) | 4 |
| 50% Toluene, Solution Tolerance, g/10 g | |
| Isopropanol tolerance | 11.9 |
| Mineral Spirits tolerance | 13.8 |
| Acetone tolerance | Infinite |
| Methyl ethyl ketone tolerance | Infinite |
| Tg (Glass Transition temperature), °C. | 32 |

EXAMPLE 7

| FORMULA | WEIGHT % |
|---|---|
| A styrene/acrylic ester copolymer in toluene polymer solids approximately 65% (Monsanto RP-2145) | 55.56 |
| Gum rosin | 44.44 |
| | 100.00 |

| PRODUCT PROPERTIES | |
|---|---|
| Softening Point, R & B, °C. (MP) | 97 |
| Acid Number (AN) | 88.4 |
| Viscosity, Gardner 50% Toluene, 25° C. (V5T) | F− |
| Color, Gardner 50% Toluene (C5T) | 9+ |
| 50% Toluene, Solution Tolerance, g/10 g | |
| Isopropanol tolerance | 15.2 |
| Mineral Spirits tolerance | 13.6 |
| Acetone tolerance | Infinite |
| Methyl ethyl ketone tolerance | Infinite |

EXAMPLE 8

| FORMULA | WEIGHT % |
|---|---|
| A solution of styrene/methyl acrylate/acrylic acid copolymer in toluene with a solids content of approximately 50% | 75.00 |
| Gum rosin | 25.00 |
| | 100.00 |

| PRODUCT PROPERTIES | |
|---|---|
| Softening Point, R & B, °C. (MP) | 127 |
| Acid Number (AN) | 71.1 |
| Viscosity, Gardner 50% Toluene, 25° C. (V5T) | U-V |
| Color, Gardner 50% Toluene (C5T) | 8+ |
| 50% Toluene, Solution Tolerance, g/10 g | |
| Isopropanol tolerance | 5.4 |
| Mineral Spirits tolerance | 6.0 |
| Acetone tolerance | Infinite |
| Methyl ethyl ketone tolerance | Infinite |

EXAMPLE 9

| FORMULA | WEIGHT % |
|---|---|
| A solution of styrene/butyl acrylate/acrylic acid copolymer in toluene with a solids content of approximately 50% | 75.00 |
| Gum rosin | 25.00 |
| | 100.00 |

| PRODUCT PROPERTIES | |
|---|---|
| Softening Point, R & B, °C. (MP) | 107.5 |
| Acid Number (AN) | 67.1 |
| Viscosity, Gardner 50% Toluene, 25° C. (V5T) | J |
| Color, Gardner 50% Toluene (C5T) | 6+ |
| 50% Toluene, Solution Tolerance, g/10 g | |
| Isopropanol tolerance | 9.1 |
| Mineral Spirits tolerance | 16.9 |
| Acetone tolerance | Infinite |
| Methyl ethyl ketone tolerance | Infinite |

EXAMPLE 10

| FORMULA | WEIGHT % |
|---|---|
| A solution of styrene/2-ethyl hexyl acrylate/acrylic acid copolymer in toluene with a solids content of approximately 50% | 75.00 |
| Gum rosin | 25.00 |
| | 100.00 |

| PRODUCT PROPERTIES | |
|---|---|
| Softening Point, R & B, °C. (MP) | 106.5 |
| Acid Number (AN) | 66.3 |
| Viscosity, Gardner 50% Toluene, 25° C. (V5T) | I |
| Color, Gardner 50% Toluene (C5T) | 8+ |
| 50% Toluene, Solution Tolerance, g/10 g | |
| Isopropanol tolerance | 7.5 |
| Mineral Spirits tolerance | 48.2 |
| Acetone tolerance | Infinite |
| Methyl ethyl ketone tolerance | Infinite |

EXAMPLE 11

| FORMULA | WEIGHT % |
|---|---|
| A solution of styrene/butyl methacrylate/acrylic acid copolymer in toluene with a solids content of approximately 50% | 75.00 |
| Gum rosin | 25.00 |
| | 100.00 |

-continued

PRODUCT PROPERTIES

| | |
|---|---|
| Softening Point, R & B, °C. (MP) | 121.5 |
| Acid Number (AN) | 64.5 |
| Viscosity, Gardner 50% Toluene, 25° C. (V5T) | L |
| Color, Gardner 50% Toluene (C5T) | 9+ |
| 50% Toluene, Solution Tolerance, g/10 g | |
| Isopropanol tolerance | 7.4 |
| Mineral Spirits tolerance | 23.9 |
| Acetone tolerance | Infinite |
| Methyl ethyl ketone tolerance | Infinite |

In each Example, the actual yield is approximately 98% of the theoretical.

If higher viscosity, higher melting point, or reduced acid number is desired in the product, the resin can be modified by the addition of a glycol or polyol.

To form the resins of the present invention, the acrylic polymer and the gum rosin are charged to a suitable reactor and heated to 190° C, removing solvent as required. The reactor is purged with nitrogen gas and allowed to cool back to 180° C; at that point the glycol can be added. The mixture is heated to 210° C., held for one (1) hour, then heated to 250° C. removing solvent and steam and/or vacuum stripped to obtain physical properties. Set forth below are two further examples of products made in this manner.

EXAMPLE 12

| FORMULA | WEIGHT % |
|---|---|
| A solution of styrene/ethyl acrylate/ acrylic acid copolymer in toluene with resin solids approximately 50% | 74.3 |
| Gum rosin | 25.0 |
| Ethylene glycol | 0.7 |
| | 100.00 |

PRODUCT PROPERTIES

| | |
|---|---|
| Softening Point, R & B, °C. (MP) | 123.5 |
| Acid Number (AN) | 59.5 |
| Viscosity, Gardner 50% Toluene, 25° C. (V5T) | W− |
| Color, Gardner 50% Toluene (C5T) | 10+ |
| 50% Toluene, Solution Tolerance, g/10 g | |
| Isopropanol tolerance | 6.6 |
| Mineral Spirits tolerance | 8.0 |
| Acetone tolerance | Infinite |
| Methyl ethyl ketone tolerance | Infinite |

EXAMPLE 13

| FORMULA | WEIGHT % |
|---|---|
| A solution of styrene/acrylic ester copolymer in toluene, resin solids approximately 65% | 86.67 |
| Gum rosin | 13.00 |
| Diethylene glycol | 0.33 |
| | 100.00 |

PRODUCT PROPERTIES

| | |
|---|---|
| Softening Point, R & B, °C. (MP) | 125 |
| Acid Number (AN) | 38.4 |
| Viscosity, Gardner 50% Toluene, 25° C. (V5T) | Z3− |
| Color, Gardner 50% Toluene (C5T) | 5+ |
| 50% Toluene, Solution Tolerance, g/10 g | |
| Isopropanol tolerance | 13.1 |
| Mineral Spirits tolerance | 6.3 |
| Acetone tolerance | Infinite |
| Methyl ethyl ketone tolerance | Infinite |

EXAMPLE 14

| FORMULA | WEIGHT % |
|---|---|
| RP-2145 (A styrene/acrylic ester copolymer in toluene, resin solids approximately 65%) | 86.67 |
| Gum Rosin | 13.00 |
| Ethylene Glycol | 0.33 |
| | 100.00 |

PRODUCT PROPERTIES

| | |
|---|---|
| Softening Point, R&B, °C. (SP) | 118 |
| Acid Number (AN) | 40.2 |
| Viscosity, Gardner 50% Toluene, 25° C. (V5T) | Z− |
| Color, Gardner 50% Toluene (C5T) | 6 |
| 50% Toluene, Solution Tolerance, g/10 g | |
| Isopropanol tolerance | 11.3 |
| Mineral Spirits tolerance | 5.9 |
| Acetone tolerance | Infinite |
| Methyl Ethyl Ketone tolerance | Infinite |

EXAMPLLE 15

| FORMULA | WEIGHT % |
|---|---|
| RP-2145 (A styrene/acrylic ester copolymer in toluene, resin solids approximately 65%) | 85.10 |
| Gum Rosin | 12.77 |
| Polyethylene Glycol 400 | 2.13 |
| | 100.00 |

PRODUCT PROPERTIES

| | |
|---|---|
| Softening Point, R&B, °C. (SP) | 123 |
| Acid Number (AN) | 39.0 |
| Viscosity, Gardner 50% Toluene, 25° C. (V5T) | Z3+ |
| Color, Gardner 50% Toluene (C5T) | 6+ |
| 50% Toluene, Solution Tolerance, g/10 g | |
| Isopropanol tolerance | 13.1 |
| Mineral Spirits tolerance | 6.9 |
| Acetone tolerance | Infinite |
| Methyl Ethyl Ketone tolerance | Infinite |

If a lower softening point is desired in the product, the resin can be modified by the addition of distilled tall oil.

The following procedure car: be used; the acrylic polymer, the gum rosin and the distilled tall oil are charged to a suitable reactor, the mixture is heated to about 250° C, removing solvent and small amounts of water. Upon reaching 250° C the product is steamed and/or vacuum stripped to remove solvent, light ends, to reduce odor and obtain physical properties.

EXAMPLE 16

| FORMULA | WEIGHT % |
|---|---|
| RP-2145 (A styrene/acrylic ester copolymer in toluene, resin solids approximately 65%) | 86.96 |
| Distilled Tall Oil | 6.52 |
| Gum Rosin | 6.52 |
| | 100.00 |

PRODUCT PROPERTIES

| | |
|---|---|
| Softening Point, R&B, °C. (SP) | 88 |
| Acid Number (AN) | 43.8 |
| Viscosity, Gardner 50% Toluene, 25° C. (V5T) | N+ |
| Color, Gardner 50% Toluene (C5T) | 4+ |
| 50% Toluene, Solution Tolerance, g/10 g | |
| Isopanol tolerance | 10.7 |
| Mineral Spirits tolerance | 10.7 |
| Acetone tolerance | Infinite |

| -continued | |
|---|---|
| Methyl Ethyl Ketone tolerance | Infinite |

In the foregoing sixteen examples various ASTM standard test procedures were used. More specifically, softening point was tested using ASTM standard E-28; viscosity was measured using the Gardner-Holdt Method bearing ASTM designation D-803; color was measured using a Gardner Color Scale bearing ASTM designation D 1544-80, and acid value was determined using standard test method bearing ASTM designation D 1639-83.

The rosin used in the present invention may comprise any known rosin, preferably a gum rosin such as CHINESE SAILING BOAT brand rosin from PDM, Inc.

A resin made in accordance with the present invention has been used as a component of a toner composition. The toner composition so made demonstrates an appropriate charge and other beneficial characteristics. Set forth below are two examples of a toner composition made using resins of the present invention.

EXAMPLE 17

| FORMULA | WEIGHT % |
|---|---|
| A solution of styrene/ethyl acrylate/acrylic acid copolymer with toluene and resin solids approximately 50% sold by Monsanto under the designation RP-1215 | 71.8 |
| Gum rosin | 20.2 |
| Carbon | 8.0 |
| PRODUCT PROPERTIES | |
| Q/M Charge | 2.4 |
| Median Volume | 10.6 |
| Melt Index | 36.3 |

Jet Milling Conditions: 80psi; 3 grams/min.
Uncoated ferrite carrier
Compound Conditions: 15 min. at 125° C.
8% Regal 300 carbon

EXAMPLE 18

| FORMULA | WEIGHT % |
|---|---|
| Monsanto RP-1215 | 55.2 |
| Gum rosin | 36.8 |
| Carbon | 8.0 |
| PRODUCT PROPERTIES | |
| Q/M-Charge | 2.3 |
| Median Volume | 11.0 |
| Melt Index | 180.0 |

Jet Milling Conditions: 80psi; 3 grams/min.
Uncoated ferrite carrier
Compound conditions: 15 min. at 125° C.
8% Regal 300 carbon In Examples 17 and 18, melt index was determined using ASTM D1238-79; particle size was determined using ASTM F577-78; and charge was determined as follows: The developer polarity and triboelectric value is measured by using a Faraday cage which can hold the carrier and allow the Dry Ink to pass through screened openings when compressed air is applied. The charge is measured in volts and the value is reported with respect to polarity and calculated triboelectric value (micro coulombs per gram of Dry Ink removed) using the equation:

$$\text{Triboelectric value volts/g} = \frac{(\text{Voltage}) \times (\text{Capacitance})}{(\text{Weight of toner blown off})}$$

As is clear from the foregoing examples, a dry toner composition formed from the toner binder of the present invention will have several important features and advantages including an inherent positive charge so as to minimize the amount of charge controlling dye which must be added to the toner; and an improved compatibility for more uniform dispersal of the dye and uniform charging of the toner particles thereby reducing undesirable fogging or tracking phenomena.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A rosin modified styrene acrylic copolymer resin comprising the heat reaction product of a solution polymerized styrene acrylic copolymer and rosin; and a solvent.

2. The resin of claim 1 wherein said solvent is removed by steam stripping.

3. The resin of claim 1 wherein said solvent is selected from the group consisting of toluene and xylene.

4. The resin of claim 1 wherein the rosin is gum rosin.

5. The resin of claim 1 wherein said styrene acrylic copolymer is formed from an acrylic co-monomer selected from the group consisting of ethyl acrylate, ethyl methacrylate, butyl acrylate, and butyl methacrylate.

6. The resin of claim 1 wherein said resin has a positive charge.

7. The resin of claim 6 wherein said positive charge is at least 2.0 volts/g.

8. The resin of claim 1 wherein the styrene acrylic copolymer is between 55% and 91% of the copolymer and rosin and the rosin is between 9% and 45% of the copolymer and rosin.

9. The resin of claim 1, further including a glycol.

10. The resin of claim 9 wherein the glycol is ethylene glycol.

11. The resin of claim 1 and further including a polyol.

12. A method for preparing a rosin modified styrene acrylic copolymer resin suitable for use in a toner binder composition comprising the steps of:
(a) copolymerizing, in a solvent, acrylic monomers by vinyl addition polymerization with up to 10 weight percent of acrylic acid or methacrylic acid to provide an acid-modified acrylic polymer;
(b) adding rosin to the copolymerized acrylic monomers;
(c) stirring the mixture obtained in step (b) until a homogeneous solution is obtained;
(d) stripping the solvent from the homogeneous solution with heat, under reduced pressure, to obtain a copolymerized resin melt, and;
(e) cooling the resin melt and flaking the solid resin.

13. The method of claim 12 wherein the acrylic monomers are selected from the group consisting of ethyl acrylate, ethyl methacrylate, butyl acrylate, and butyl methacrylate.

14. The method of claim 12 further including the step of adding a co-monomer selected from the group consisting of styrene and acrylonitrile during said copolymerizing step.

15. The method of claim 12 wherein the step of stripping the solvent includes a final steam stripping stage.

16. The method of claim 12 wherein during said stripping step the mixture is heated to a temperature of between 220° C. and 290° C.

17. The method of claim 16 wherein during said steam stripping step the mixture is heated to a temperature of between 240° C. and 260° C.

18. The method of claim 17 wherein said mixture is heated to 250° C.

19. A rosin modified styrene acrylic copolymer resin prepared by the method of claim 13 wherein said resin exhibits a single glass transition temperature intermediate to the glass transition temperatures of the acrylic polymer and the rosin, and wherein said resin is compatible with lacquer resins both in solution and in film form.

* * * * *